(12) United States Patent
Shirai

(10) Patent No.: US 10,699,083 B2
(45) Date of Patent: *Jun. 30, 2020

(54) ANTENNA SUBSTRATE, IMAGE FORMING APPARATUS

(71) Applicant: KYOCERA Document Solutions Inc., Osaka-shi, Osaka (JP)

(72) Inventor: Wataru Shirai, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 122 days.

This patent is subject to a terminal disclaimer.

(21) Appl. No.: 16/007,860

(22) Filed: Jun. 13, 2018

(65) Prior Publication Data

US 2018/0373908 A1 Dec. 27, 2018

(30) Foreign Application Priority Data

Jun. 23, 2017 (JP) ................... 2017-123488

(51) Int. Cl.
*G06K 7/08* (2006.01)
*G06K 7/10* (2006.01)
*H01Q 7/00* (2006.01)
*H01Q 1/38* (2006.01)
*G03G 15/00* (2006.01)
(Continued)

(52) U.S. Cl.
CPC ..... *G06K 7/10316* (2013.01); *G03G 15/0863* (2013.01); *G03G 15/5075* (2013.01); *G03G 21/1657* (2013.01); *H01Q 1/2225* (2013.01); *H01Q 1/38* (2013.01); *H01Q 7/00* (2013.01); *H01Q 7/005* (2013.01); *G03G 21/1882* (2013.01); *G03G 2215/00109* (2013.01); *H01Q 1/2216* (2013.01); *H01Q 1/248* (2013.01)

(58) Field of Classification Search
CPC .. G06K 7/10316; G06K 7/10336; H01Q 1/22; H01Q 1/2216; H01Q 1/2225; H01Q 1/36; H01Q 1/38; H01Q 7/00; H01Q 7/005; H01Q 7/02; H01Q 7/06

See application file for complete search history.

(56) References Cited

U.S. PATENT DOCUMENTS 7,198,198 B2 * 4/2007 Akiho ................ G06K 7/10316
235/492
7,336,243 B2 * 2/2008 Jo ...................... G06K 19/0726
340/572.7

(Continued)

FOREIGN PATENT DOCUMENTS

| JP | 2004206736 A | 7/2004 |
| JP | 2008078965 A | 4/2008 |
| JP | 2014146968 A | 8/2014 |

*Primary Examiner* — Thien M Le
*Assistant Examiner* — April A Taylor
(74) *Attorney, Agent, or Firm* — Alleman Hall Creasman & Tuttle LLP

(57) ABSTRACT

An antenna substrate includes a substrate, a modulating/demodulating circuit and a switch circuit each mounted on the substrate, and a printed antenna printed on the substrate. The printed antenna includes a plurality of unit coils. An end of one of the plurality of unit coils is electrically connected to the modulating/demodulating circuit. The switch circuit, according to a received control signal, selectively switches between an electrically interrupted state and a state in which a portion or all of the plurality of unit coils is electrically connected in series.

9 Claims, 5 Drawing Sheets

(51) Int. Cl.
*G03G 15/08* (2006.01)
*H01Q 1/22* (2006.01)
*G03G 21/16* (2006.01)
G03G 21/18 (2006.01)
H01Q 1/24 (2006.01)

(56) References Cited

U.S. PATENT DOCUMENTS

| | | | | |
|---|---|---|---|---|
| 7,580,675 | B2* | 8/2009 | Kuriki | H04B 5/0056 |
| | | | | 340/10.4 |
| 8,503,931 | B2* | 8/2013 | Wilson | G06K 19/0723 |
| | | | | 235/451 |
| 8,843,095 | B2* | 9/2014 | Nakayama | H04B 5/0081 |
| | | | | 455/277.1 |
| 2007/0205291 | A1* | 9/2007 | Aramaki | G06K 19/07749 |
| | | | | 235/492 |
| 2010/0103055 | A1 | 4/2010 | Waku et al. | |
| 2010/0214187 | A1* | 8/2010 | Sugita | G06K 19/07749 |
| | | | | 343/788 |
| 2015/0346039 | A1* | 12/2015 | Ito | G06K 19/0717 |
| | | | | 374/117 |
| 2018/0301805 | A1* | 10/2018 | Mikawa | H01Q 3/24 |

* cited by examiner

ANTENNA SUBSTRATE, IMAGE FORMING APPARATUS

INCORPORATION BY REFERENCE

This application is based upon and claims the benefit of priority from the corresponding Japanese Patent Application No. 2017-123488 filed on Jun. 23, 2017, the entire contents of which are incorporated herein by reference.

BACKGROUND

In general, an image forming apparatus includes a unit attaching portion to which a replenishing unit storing developer can be removably attached. Furthermore, the image forming apparatus may include a tag reader for performing wireless communication with an electronic tag via an antenna. The tag reader includes the antenna for short-range wireless communication.

For example, the antenna is a coil antenna made of a metal foil printed on a substrate in a coil-shape. The substrate is provided on the unit attaching portion. On the other hand, the electronic tag is attached on the replenishing unit. The tag reader may read information relating to color, type, and the like of the developer from the electronic tag.

In addition, there is known an auxiliary antenna that is attached to the replenishing unit for reducing resonance frequency of the electronic tag when the antenna and the electronic tag are in close proximity.

SUMMARY

An antenna substrate according to an aspect of the present disclosure includes a substrate, a modulating/demodulating circuit, a printed antenna, and a first switch circuit. The modulating/demodulating circuit, mounted on the substrate, is configured to output and input a communication signal used for short-range wireless communication with an electronic tag. The printed antenna, printed on the substrate, is configured to transmit and receive the communication signal as a radio wave. The first switch circuit is mounted on the substrate. The printed antenna includes a plurality of unit coils, each of which is a metal foil printed in a coil-shape on the substrate. An end of one of the plurality of unit coils is electrically connected to the modulating/demodulating circuit. The first switch circuit, according to a received first control signal, selectively switches between an electrically interrupted state and a state in which a portion or all of the plurality of unit coils is electrically connected in series.

An image forming apparatus according to another aspect of the present disclosure includes a unit attaching portion, the antenna substrate, and a processor. A replenishing unit storing developer can be removably attached to the unit attaching portion. The antenna substrate is provided corresponding to the unit attaching portion. The processor is configured to output the first control signal to the first switch circuit on the antenna substrate. Furthermore, the processor is configured to read out information from an electronic tag that is attached on the replenishing unit attached to the unit attaching portion, by using the short-range wireless communication via the printed antenna on the antenna substrate.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

First Embodiment

An image forming apparatus 10 according to a first embodiment includes an image forming portion 40 for executing print processing to form an image on a sheet. The sheet is a sheet-like image forming medium such as a sheet of paper or resin film. The image forming portion 40 is an example of a print processing device.

Figure 1:
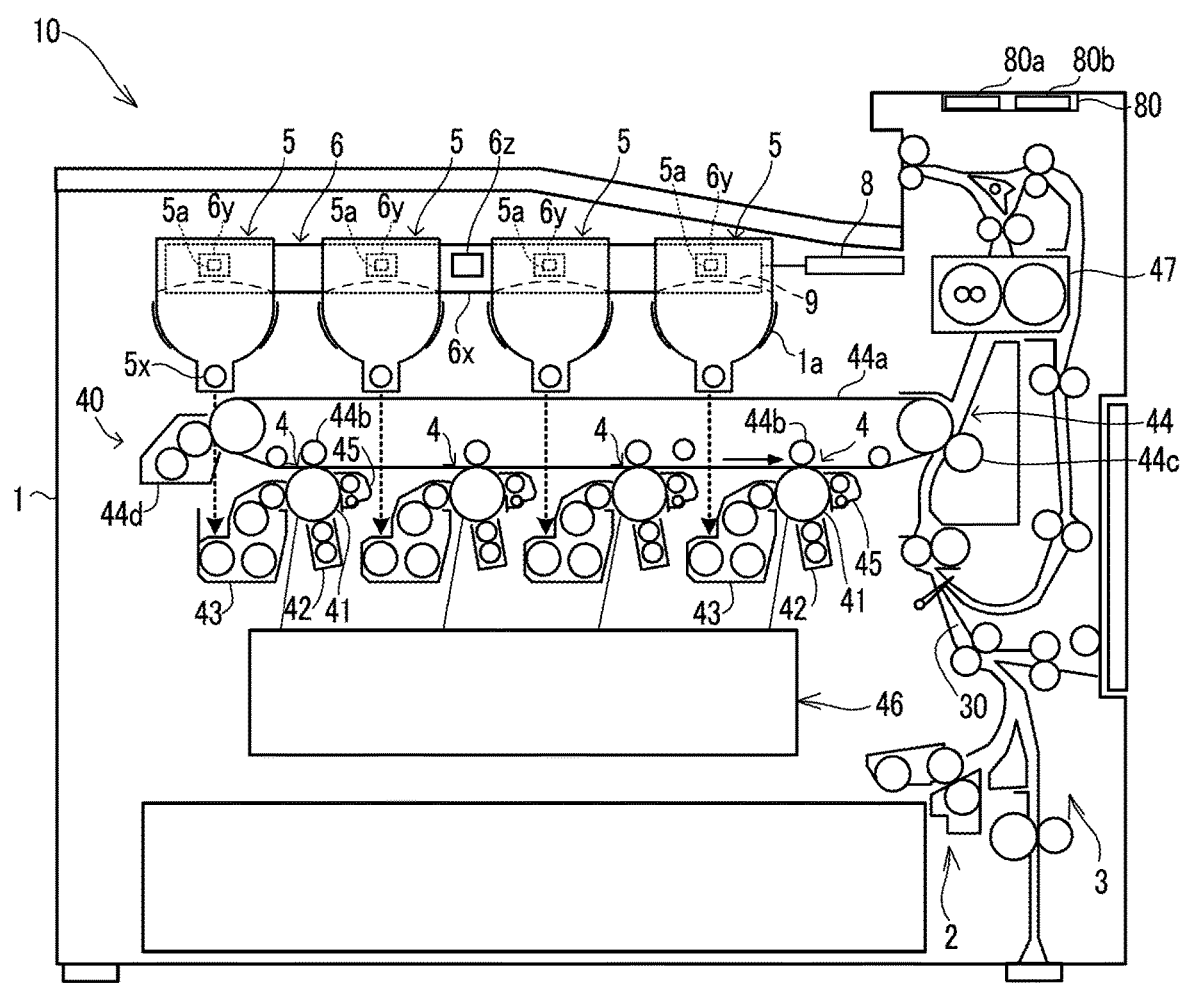
FIG. 1 is a configuration diagram of an image forming apparatus according to a first embodiment.

As shown in FIG. 1, the image forming apparatus 10 includes, within a body 1, a sheet supplying mechanism 2, a sheet conveying mechanism 3, the image forming portion 40, and a control device 8. Furthermore, a user interface unit 80 is attached to an outer surface of the body 1.

The image forming portion 40 is configured to execute the print processing electrographically. In this case, the image forming portion 40 includes a plurality of imaging devices 4, an optical scanning portion 46, a transfer device 44, and a fixing device 47. Each imaging device 4 includes a photoconductor 41, a charging device 42, a developing device 43, and a photoconductor cleaning device 45.

The image forming apparatus 10 shown in FIG. 1 is a color image forming apparatus having the tandem-type image forming portion 40. Accordingly, the image forming portion 40 includes four imaging devices 4 in correspondence with colors cyan, magenta, yellow, and black.

Furthermore, the transfer device 44 includes an intermediate transfer belt 44a, four primary transfer devices 44b corresponding to the four imaging devices 4, a secondary transfer device 44c, and a belt cleaning device 44d.

The sheet supplying mechanism 2 delivers the sheet to a conveyance path 30. The sheet conveying mechanism 3 conveys the sheet along the conveyance path 30.

The intermediate transfer belt 44a and the drum-shaped photoconductor 41 in each of the imaging devices 4 are rotationally driven by a drive mechanism (not shown). The charging device 42 uniformly charges a surface of the photoconductor 41. The optical scanning portion 46 writes an electrostatic latent image on the surface of the photoconductor 41.

The developing device 43 develops the electrostatic latent image on the surface of the photoconductor 41 with developer 9. This allows for an image of the developer 9 to be formed on the surface of the photoconductor 41. It is noted that the developer 9 in the present embodiment is toner.

The primary transfer devices 44b transfer the images of the developer 9 from the surfaces of the photoconductors 41 to the intermediate transfer belt 44a. This allows for a color image to be formed on the intermediate transfer belt 44a from the images of four colors of the developer 9. The photoconductor cleaning device 45 removes the developer 9 remaining on the surface of the photoconductor 41.

The secondary transfer device 44c transfers the image of the developer 9 from the intermediate transfer belt 44a to the sheet being conveyed along the conveyance path 30. The fixing device 47 heats the image of the developer 9 transferred on the sheet to fix the image of the developer 9 to the sheet. The belt cleaning device 44d removes the developer 9 remaining on the intermediate transfer belt 44a.

Furthermore, the image forming apparatus 10 includes four replenishing units 5 that each store a different color of the developer 9. The four replenishing units 5 are removably attached to four unit attaching portions 1a provided in the body 1.

The four replenishing units 5 each replenish the developer 9 to the four developing devices 43. Each replenishing unit 5 includes a replenishing screw 5x that is rotationally driven by a driving mechanism (not shown). When the replenishing screw 5x rotates, the developer 9 is supplied from the replenishing unit 5 to the developing device 43.

The user interface unit 80 includes an operation device 80a and a display device 80b. The operation device 80a includes a touch panel or operation buttons that receive operations from a user. In addition, the display device 80b includes a display panel such as a liquid crystal display panel that can display information.

The control device 8 controls electric devices in the image forming apparatus 10. The control device 8 may include a CPU (Central Processing Unit), a main storage portion such as a RAM (Random Access Memory), a secondary storage portion, and a communication interface.

The CPU processes various types of data and controls the electric devices by executing a program preliminarily stored in the secondary storage portion.

The main storage portion primarily stores programs executed by the CPU, and data processed by the CPU. The secondary storage portion is a computer readable, non-volatile storage device. For example, the secondary storage portion may be a flash memory.

The communication interface performs data communication with external devices such as an information processing device. For example, the communication interface may receive print job data from the information processing device.

It is noted that the control device 8 may be realized by another processor such as a DSP (Digital Signal Processor), or a circuit such as an ASIC (Application Specific Integrated Circuit).

[Electronic Tag 5a]

An electronic tag 5a is attached on each of the replenishing units 5. The electronic tag 5a is a passive electronic tag. For example, the electronic tag 5a may be a passive RF (Radio Frequency) tag.

Figure 2:
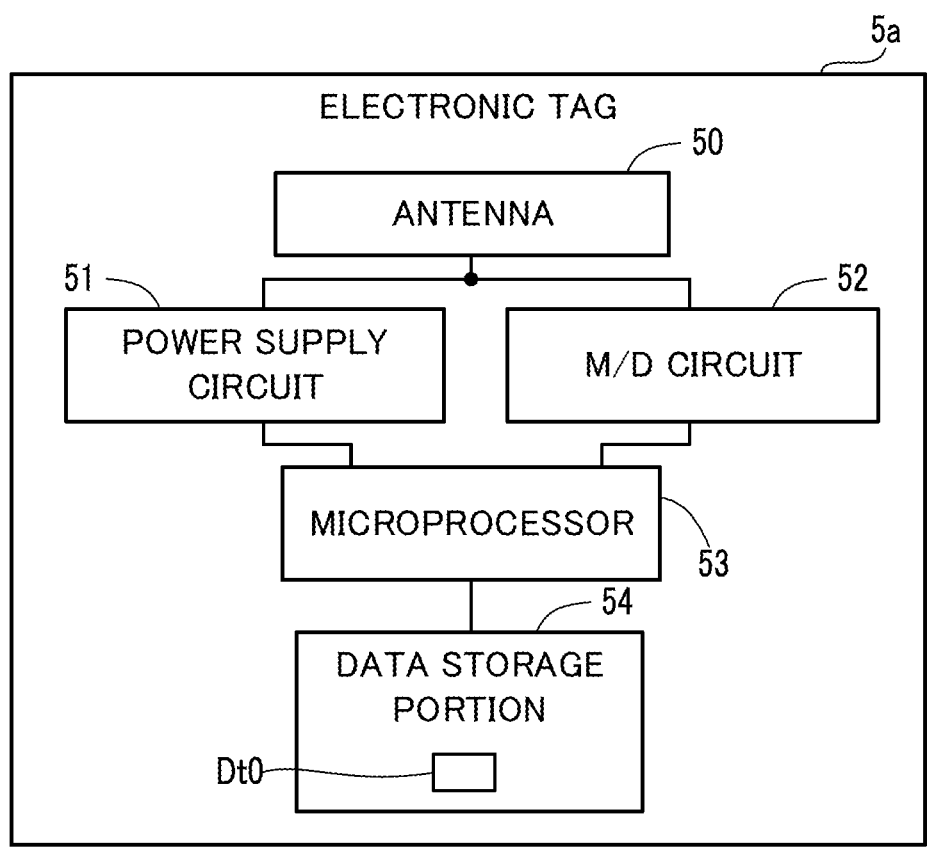
FIG. 2 is a block diagram of an electronic tag attached on a replenishing unit.

As shown in FIG. 2, each electronic tag 5a includes an antenna 50 for short-range wireless communication, a power supply circuit 51, a modulating/demodulating circuit 52, a microprocessor 53, and a computer-readable, non-volatile data storage portion 54.

The data storage portion 54 may be a flash memory. The data storage portion 54 of the electronic tag 5a preliminarily stores tag data Dt0 that includes information relating to the developer 9, such as a color and type of the developer 9 stored in the replenishing unit 5 on which the electronic tag 5a is attached. Furthermore, the tag data Dt0 may include unit identification data unique to each replenishing unit 5.

The power supply circuit 51 rectifies a received signal received by the antenna 50 and applies a DC voltage to the microprocessor 53. The modulating/demodulating circuit 52 demodulates the received signal received by the antenna 50 and sends the demodulated received data to the microprocessor 53. Furthermore, the modulating/demodulating circuit 52 modulates transmission data output from the microprocessor 53 and sends the modulated transmission signal to the antenna 50. The transmission signal is output from the antenna 50 as a transmission radio wave.

The microprocessor 53, via the antenna 50 and a modulating/demodulating circuit 62, performs data communication with a tag communication circuit 6y of an antenna substrate 6 that is described below.

Specifically, the microprocessor 53, upon receiving a read command from the tag communication circuit 6y, transmits data stored in the data storage portion 54 to the tag communication circuit 6y. Furthermore, the microprocessor 53, upon receiving a write command and data from the tag communication circuit 6y, stores the received data in the data storage portion 54.

[Outline of Antenna Substrate 6]

The image forming apparatus 10 further includes the antenna substrate 6. The antenna substrate 6 is a so-called tag reader/writer for transmitting and receiving data to and from the electronic tag 5a by the short-range wireless communication.

The antenna substrate 6 includes a substrate 6x and multiple tag communication circuits 6y provided on the substrate 6x. As described below, each of the tag communication circuits 6y includes a wiring pattern that is a metal foil printed on the substrate 6x, and a semiconductor element mounted on the substrate 6x. The substrate 6x is a plate-like insulator.

The tag communication circuits 6y are provided in correspondence to the unit attaching portions 1a. Accordingly, the antenna substrate 6 in the present embodiment includes four tag communication circuits 6y.

In the present embodiment, the antenna substrate 6 further includes a microprocessor 6z that is mounted on the substrate 6x and electrically connected to the four tag communication circuits 6y.

The microprocessor 6z, by performing the short-range wireless communication with the electronic tags 5a via the tag communication circuits 6y, reads out the tag data Dt0 from the electronic tags 5a and writes data to the electronic tags 5a. The microprocessor 6z, according to a communication command from the control device 8, communicates with the electronic tags 5a.

The replenishing unit 5 is attached to the unit attaching portion 1a such that the electronic tag 5a attached on the replenishing unit 5 is in a communication area of the tag communication circuit 6y in the short-range wireless communication. In this state, the microprocessor 6z is able to transmit and receive data to and from the electronic tag 5a.

Meanwhile, after the image forming apparatus 10 is designed and manufactured, an electronic tag 5a with specifications different from original specifications may be employed for the replenishing unit 5, due to various reasons. For example, the reason may be that the specifications of the electronic tag 5a have been changed, or that procurement of the original electronic tag 5a has become difficult.

In conventional apparatuses, there is a case in which a tag reader cannot satisfactorily communicate with an electronic tag 5a with new specifications. In this case, an antenna of the tag reader needs to be exchanged with another antenna having a different number of turns. However, it is difficult to exchange the antenna of an apparatus already on the market.

On the other hand, in the image forming apparatus 10, even when specifications of the electronic tag 5a attached on the replenishing unit 5 storing the developer 9 are changed, the antenna substrate 6 is able to perform satisfactory short-range wireless communication with the electronic tag 5a with new specifications, without exchanging the antenna.

[Details of Antenna Substrate 6]

Figure 3:
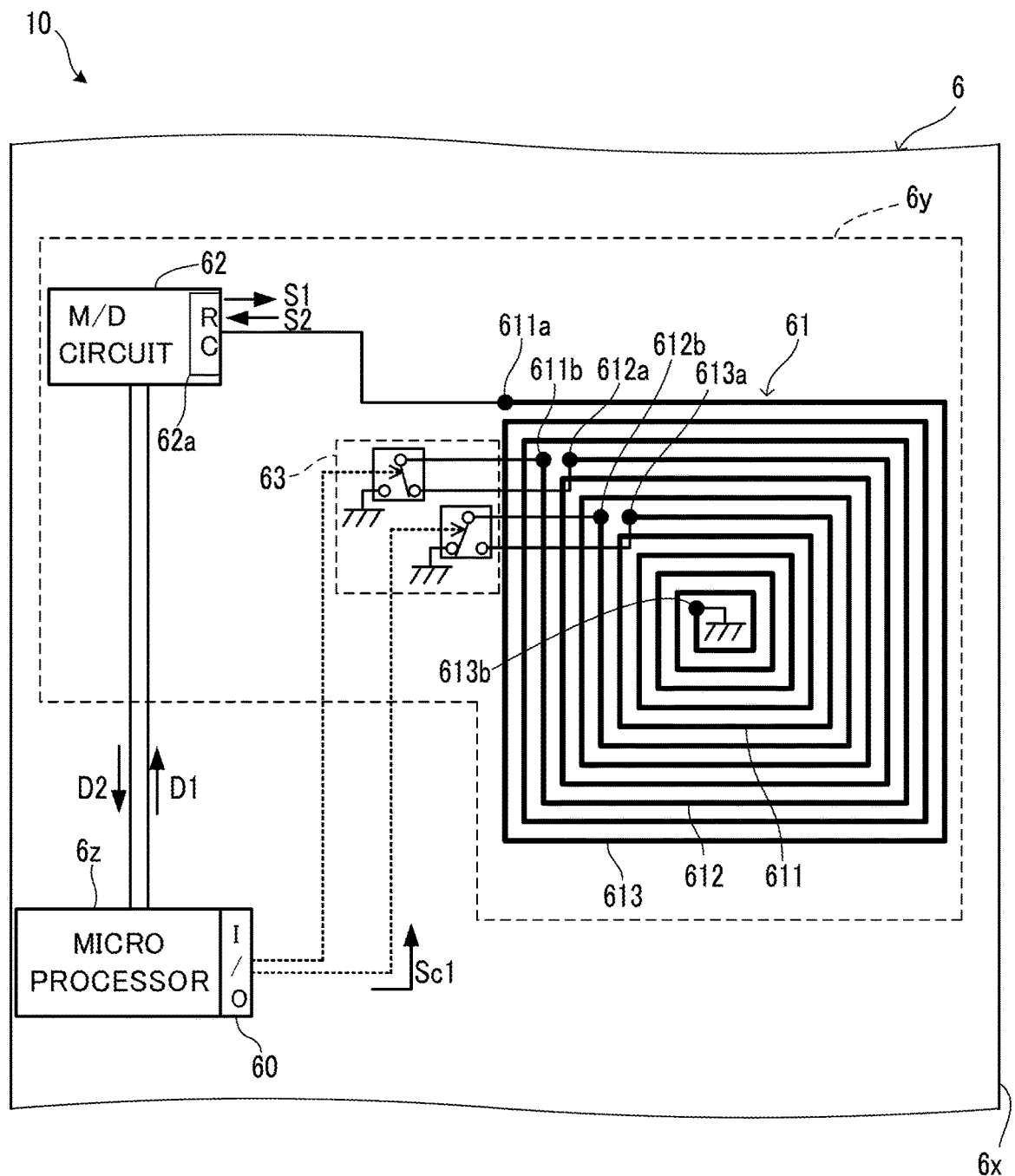
FIG. 3 is a configuration diagram of a tag communication circuit and a microprocessor in an antenna substrate included in the image forming apparatus according to the first embodiment.

As shown in FIG. 3, the plurality of tag communication circuits 6y of the antenna substrate 6 each include a printed antenna 61, the modulating/demodulating circuit 62, and a switch circuit 63. The modulating/demodulating circuit 62 and the switch circuit 63 each include multiple semiconductor elements mounted on the substrate 6x.

The modulating/demodulating circuit 62 outputs and inputs communication signals S1 and S2 that are used for the short-range wireless communication with the electronic tag 5a. It is noted that the communication signals S1 and S2 include a transmission signal S1 and a received signal S2.

The modulating/demodulating circuit 62 modulates transmission data D1 output from the microprocessor 6z and sends the modulated transmission signal S1 to the printed antenna 61. The transmission signal S1 is output from the printed antenna 61 as a transmission radio wave.

Furthermore, the modulating/demodulating circuit 62 demodulates the received signal S2 received by the printed antenna 61 and sends demodulated received data D2 to the microprocessor 6z.

The printed antenna 61 is printed on the substrate 6x, transmits the transmission signal S1 as a radio wave, and receives the received signal S2 as a radio wave. The printed antenna 61 includes a plurality of unit coils 611, 612, and 613, each of which is a metal foil printed in a coil-shape on the substrate 6x. The unit coils 611, 612, and 613 may be copper foils printed on the substrate 6x.

The printed antenna 61 shown in FIG. 3 includes the three unit coils 611, 612, and 613. It is noted that there may be two, or four or more of the unit coils included in the printed antenna 61.

In the present embodiment, the plurality of unit coils 611, 612, and 613 are concentrically aligned from an outer side going inwards along a coil-shaped series of lines.

In the present embodiment, among the three unit coils 611, 612, and 613, a first, second, and third unit coil from the outside are respectively referred to as a first unit coil 611, a second unit coil 612, and a third unit coil 613.

Furthermore, outer ends of the three unit coils 611, 612, and 613 are respectively referred to as first ends 611a, 612a, and 613a, and inner ends of the three unit coils 611, 612, and 613 are respectively referred to as second ends 611b, 612b, and 613b.

In the present embodiment, the first end 611a of the first unit coil 611 is electrically connected to the modulating/demodulating circuit 62. On the other hand, the second end 613b of the third unit coil 613 is grounded.

The switch circuit 63, according to a received control signal Sc1, selectively switches between a partially connected state, a fully connected state, and an interrupted state. The control signal Sc1 is an example of a first control signal. In addition, the switch circuit 63 is an example of a first switch circuit.

In the partially connected state, a portion of the plurality of unit coils 611, 612, and 613 is electrically connected in series. In the present embodiment, in the partially connected state, only the first unit coil 611 and the second unit coil 612 are electrically connected in series.

The switch circuit 63 shown in FIG. 3 is in the partially connected state. In this case, the switch circuit 63 electrically connects the second end 611b of the first unit coil 611 and the first end 612a of the second unit coil 612, and electrically interrupts the second end 612b of the second unit coil 612 from the first end 613a of the third unit coil 613.

In the fully connected state, all of the plurality of unit coils 611, 612, and 613 are electrically connected in series. The switch circuit 63 in the fully connected state electrically connects the second end 611b of the first unit coil 611 and the first end 612a of the second unit coil 612, and furthermore, electrically connects the second end 612b of the second unit coil 612 and the first end 613a of the third unit coil 613.

In the interrupted state, all of the plurality of unit coils 611, 612, and 613 are electrically interrupted from each other. The switch circuit 63 in the interrupted state electrically interrupts the second end 611b of the first unit coil 611 from the first end 612a of the second unit coil 612, and furthermore, electrically interrupts the second end 612b of the second unit coil 612 from the first end 613a of the third unit coil 613.

Furthermore, in a case where a portion of the plurality of unit coils 611, 612, and 613 is electrically interrupted from the modulating/demodulating circuit 62, the switch circuit 63 grounds a terminal end of the whole of the remaining unit coil(s) electrically connected to the modulating/demodulating circuit 62.

In the following description, a portion or all of the plurality of unit coils 611, 612, and 613 that is electrically connected to the modulating/demodulating circuit 62 is referred to as an employed antenna. In the present embodiment, the employed antenna always includes the first unit coil 611 whose first end 611a is electrically connected to the modulating/demodulating circuit 62.

In the present embodiment, when the switch circuit 63 is in the partially connected state, the employed antenna is the first unit coil 611 and the second unit coil 612 that are electrically connected to the modulating/demodulating circuit 62, and the terminal end of the employed antenna is the second end 612b of the second unit coil 612. Accordingly, the switch circuit 63 in the partially connected state grounds the second end 612b of the second unit coil 612.

In the present embodiment, when the switch circuit 63 is in the interrupted state, the employed antenna is the first unit coil 611 that is electrically connected to the modulating/demodulating circuit 62, and the terminal end of the employed antenna is the second end 611b of the first unit coil 611. Accordingly, the switch circuit 63 in the interrupted state grounds the second end 611b of the first unit coil 611.

In the present embodiment, when the switch circuit 63 is in the fully connected state, the employed antenna is the first unit coil 611, the second unit coil 612, and the third unit coil 613, and the terminal end of the employed antenna is the second end 613b of the third unit coil 613. The second end 613b of the third unit coil 613 is grounded in advance.

For example, the switch circuit 63 may be realized by a combination of multiple transistors.

In the present embodiment, the microprocessor 6z mounted on the substrate 6x outputs the control signal Sc1 to the switch circuit 63 via an I/O port 60. The I/O port 60 is a signal input/output interface included in the microprocessor 6z.

The modulating/demodulating circuit 62 performs short-range wireless communication with the electronic tag 5a via the employed antenna. That is, in the state in which the replenishing unit 5 is attached to the unit attaching portion 1a, the microprocessor 6z reads out information from and writes information to the electronic tag 5a via the short-range wireless communication between the modulating/demodulating circuit 62 and the employed antenna.

The modulating/demodulating circuit 62 includes an RC circuit 62a. The RC circuit 62a is electrically connected to the employed antenna and forms an RLC circuit together with the employed antenna.

[Manual Setting Process]

In order to specify a type of the control signal Sc1 output by the microprocessor 6z, the control device 8 may execute a manual setting process described below.

In the manual setting process, the CPU of the control device 8 displays multiple predetermined setting candidates on the display device 80b, and selects one of the multiple setting candidates according to a selection operation performed on the operation device 80a.

The multiple setting candidates correspond to multiple types of the control signal Sc1. The CPU of the control device 8 records, in the secondary storage portion (not shown), a piece of control designation information corresponding to the selected setting candidate.

Furthermore, the CPU of the control device 8 sends the control designation information recorded in the secondary storage portion to the microprocessor 6z of the antenna substrate 6. The microprocessor 6z outputs the type of control signal Sc1 indicated by the control designation information to the switch circuit 63.

For example, designation information indicating which of the multiple setting candidates should be selected may be recorded on a body of the replenishing unit 5, in an instruction manual provided to a user together with the replenishing unit 5, or the like. The user executes the selection operation on the operation device 80a according to the designation information.

[Automatic Setting Process]

In order to specify the type of the control signal Sc1 output by the microprocessor 6z, the microprocessor 6z may execute an automatic setting process described below.

In the automatic setting process, the microprocessor 6z sequentially outputs, to the switch circuit 63, multiple types of trial control signals that are respectively the multiple types of control signals Sc1.

Furthermore, each time the microprocessor 6z outputs a type of trial control signal, the microprocessor 6z executes a trial communication process for attempting communication with the electronic tag 5a via the modulating/demodulating circuit 62. The microprocessor 6z records, in a data storage device (not shown), control success information indicating a type of trial control signal that was output when the microprocessor 6z was able to properly communicate with the electronic tag 5a in the trial communication process.

For example, the data storage device may be a flash memory mounted on the secondary storage portion of the control device 8 or on the antenna substrate 6. The data storage device is computer-readable and non-volatile.

When the microprocessor 6z communicates with the electronic tag 5a after the trial communication process ends, the microprocessor 6z outputs, to the switch circuit 63, a type of the control signal Sc1 corresponding to the control success information recorded in the data storage device.

For example, when a predetermined detection sensor detects an access to the replenishing unit 5, the manual setting process or the automatic setting process may be executed. The detection sensor may be a cover sensor that detects when a cover of an opening of the unit attaching portion 1a is opened, or a unit sensor that detects when the replenishing unit 5 is removed from the unit attaching portion 1a.

In the antenna substrate 6, the number of turns in the employed antenna can be changed by changing the type of the control signal Sc1. The number of turns in each of the plurality of unit coils 611, 612, and 613 is determined by assuming change in specifications of the electronic tag 5a that may be employed for the replenishing unit 5 in future.

Accordingly, by employing the antenna substrate 6, it is possible to change the type of the control signal Sc1 when specifications of the electronic tag 5a attached to the replenishing unit 5 are changed. This allows for satisfactory short-range wireless communication to be performed between the microprocessor 6z and the electronic tag 5a with new specifications. In addition, it is not necessary to exchange parts such as the antenna substrate 6.

Second Embodiment

Figure 4:
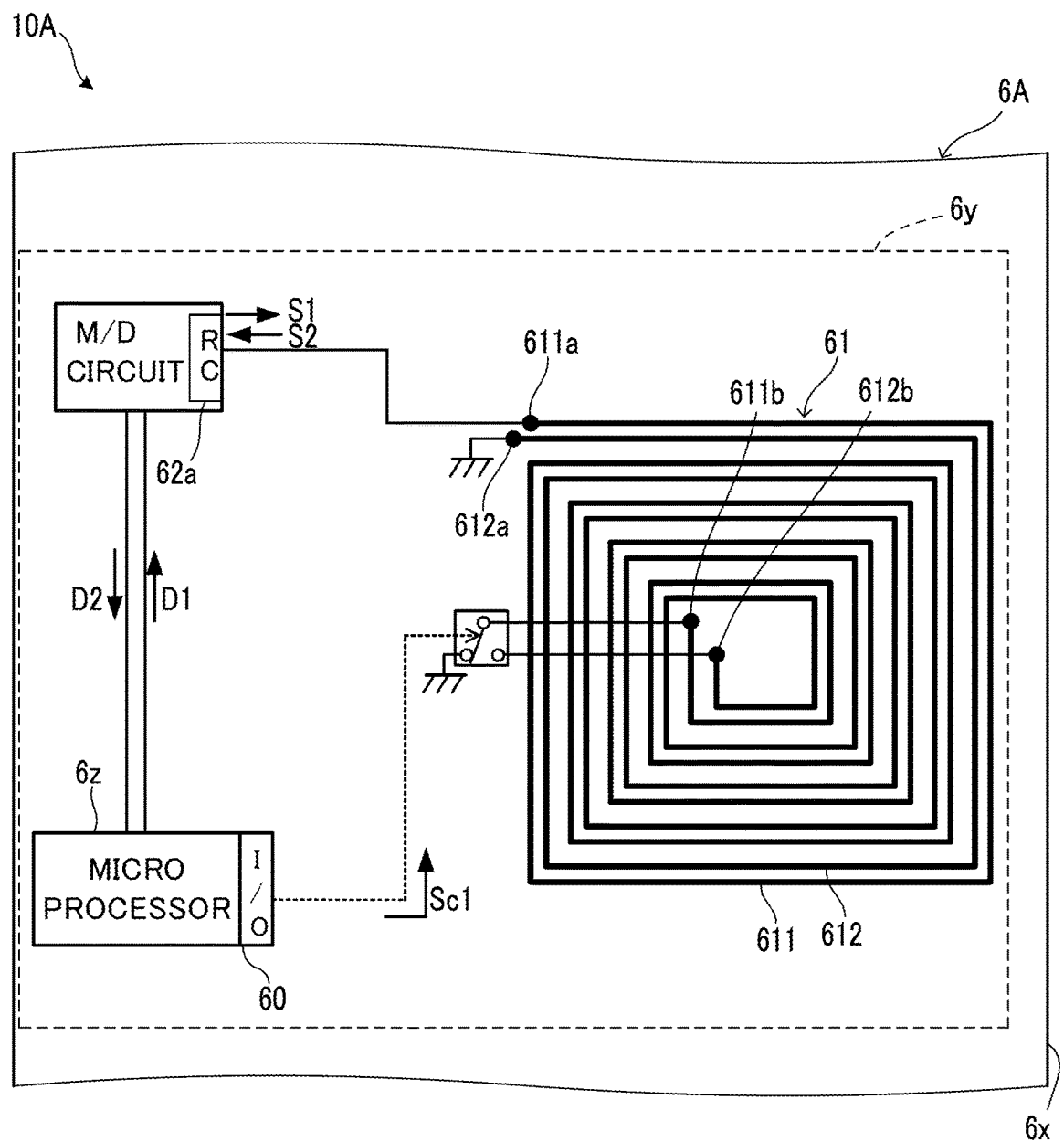
FIG. 4 is a configuration diagram of a tag communication circuit and a microprocessor in an antenna substrate included in an image forming apparatus according to a second embodiment.

Next, with reference to FIG. 4, an antenna substrate 6A included in an image forming apparatus 10A according to a second embodiment is described. In FIG. 4, components that are the same as components shown in FIG. 1 to FIG. 3 are denoted by the same reference characters. In the following, differences between the antenna substrate 6A and the antenna substrate 6 are described.

In the antenna substrate 6A, the printed antenna 61 includes the first unit coil 611 and the second unit coil 612.

The first unit coil 611 and the second unit coil 612 are formed in parallel along a series of coil-shaped lines. The first unit coil 611 and the second unit coil 612 each have the same number of turns and are formed parallel to each other with a gap in between.

It is noted that three or more unit coils may also be formed in parallel along a series of coil-shaped lines on the substrate 6x.

In the present embodiment, the first end 611a and the second end 611b of the first unit coil 611 are respectively the outer and inner ends of the first unit coil 611. In addition, the first end 612a and the second end 612b of the second unit coil 612 are respectively the outer and inner ends of the second unit coil 612. These points are the same as the antenna substrate 6.

In the present embodiment, the first end 611a of the first unit coil 611 is electrically connected to the modulating/demodulating circuit 62. On the other hand, the first end 612a of the second unit coil 612 is grounded.

The switch circuit 63, according to the received control signal Sc1, selectively switches between the fully connected state and the interrupted state. FIG. 4 shows the switch circuit 63 in the interrupted state.

The switch circuit 63 in the interrupted state electrically interrupts the second end 611b of the first unit coil 611 from the second end 612b of the second unit coil 612. In this case, the first unit coil 611 is the employed antenna.

On the other hand, the switch circuit 63 in the fully connected state electrically connects the second end 611b of the first unit coil 611 and the second end 612b of the second unit coil 612. In this case, the first unit coil 611 and the second unit coil 612 is the employed antenna.

In addition, also in the present embodiment, when electrically interrupting the second unit coil 612 from the modulating/demodulating circuit 62, the switch circuit 63 grounds the terminal end of the employed antenna. That is, the switch circuit 63 in the interrupted state grounds the second end 611b of the first unit coil 611.

By employing the antenna substrate 6A, an effect similar to when the antenna substrate 6 is employed is achieved.

Third Embodiment

Figure 5:
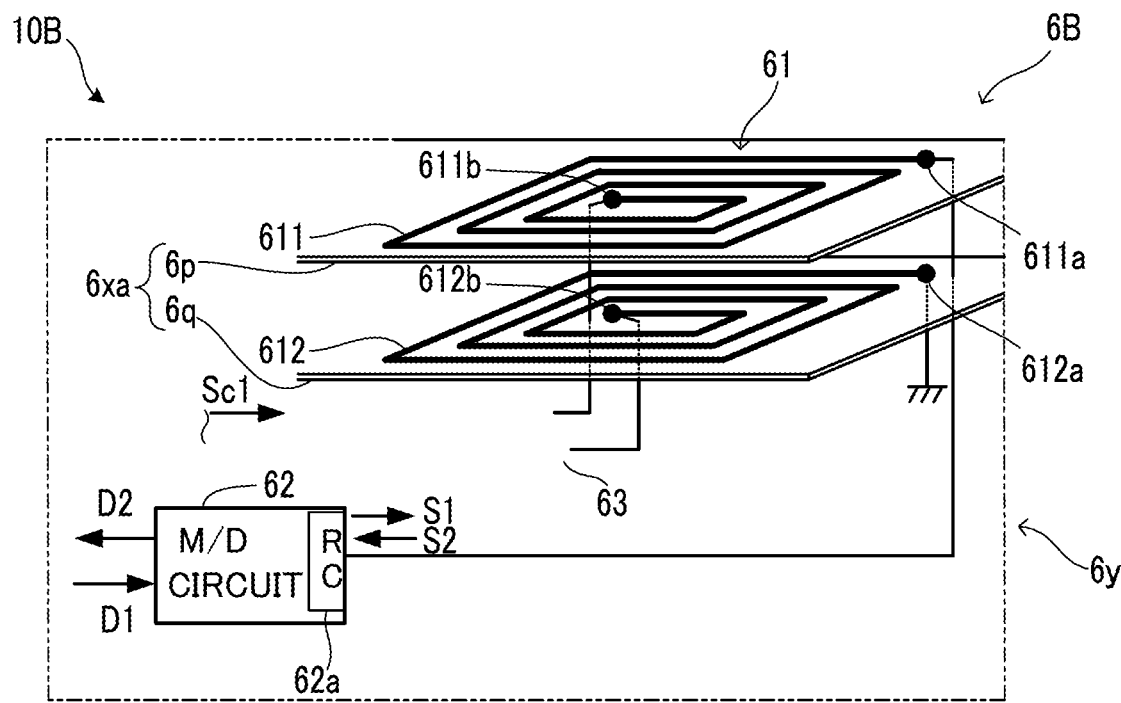
FIG. 5 is a configuration diagram of a tag communication circuit in an antenna substrate included in an image forming apparatus according to a third embodiment.

Next, with reference to FIG. 5, an antenna substrate 6B included in an image forming apparatus 10B according to a third embodiment is described. In FIG. 5, components that are the same as components shown in FIG. 1 to FIG. 3 are denoted by the same reference characters. In the following, differences between the antenna substrate 6B and the antenna substrate 6 are described.

In place of the substrate 6x, the antenna substrate 6B includes a laminated substrate 6xa that includes a plurality of layers 6p and 6q. For convenience, in FIG. 5, the plurality of layers 6p and 6q are each shown in perspective diagrams that are spaced apart.

Furthermore, for convenience, in FIG. 5, the modulating/demodulating circuit 62 and the switch circuit 63 that are originally mounted on the laminated substrate 6xa are shown in positions separate from the laminated substrate 6xa.

In the present embodiment, the plurality of unit coils 611 and 612 are each concentrically formed in a region where the plurality of layers 6p and 6q overlap each other. In the example shown in FIG. 5, the two unit coils 611 and 612 are respectively formed on the two layers 6p and 6q.

It is noted that the laminated substrate 6xa may have three or more layers, and three or more unit coils may be respectively formed on the three or more layers.

In the present embodiment, the first end 611a and the second end 611b of the first unit coil 611 are respectively the outer and inner ends of the first unit coil 611. Likewise, the first end 612a and the second end 612b of the second unit coil 612 are respectively the outer and inner ends of the second unit coil 612. These points are the same as the antenna substrate 6.

The switch circuit 63, according to the received control signal Sc1, selectively switches between the fully connected state and the interrupted state. FIG. 5 shows the switch circuit 63 in the interrupted state.

The switch circuit 63 in the interrupted state electrically interrupts the second end 611b of the first unit coil 611 from the second end 612b of the second unit coil 612. In this case, the first unit coil 611 is the employed antenna.

On the other hand, the switch circuit 63 in the fully connected state electrically connects the second end 611b of the first unit coil 611 and the second end 612b of the second unit coil 612. In this case, the first unit coil 611 and the second unit coil 612 is the employed antenna.

In addition, also in the present embodiment, when electrically interrupting the second unit coil 612 from the modulating/demodulating circuit 62, the switch circuit 63 grounds the terminal end of the employed antenna. That is, the switch circuit 63 in the interrupted state grounds the second end 611b of the first unit coil 611.

By employing the antenna substrate 6B, an effect similar to when the antenna substrate 6 is employed is also achieved. Furthermore, by employing the antenna substrate 6B, it is possible to reduce an area occupied by the printed antenna 61. As a result, it is possible to reduce an area of the antenna substrate 6B.

[First Application]

Figure 6:
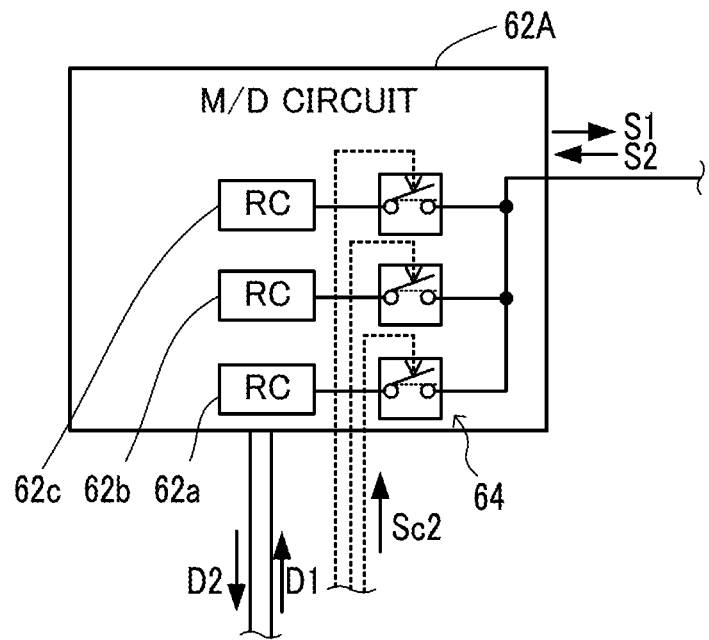
FIG. 6 is a configuration diagram of a modulating/demodulating circuit according to an application.

Next, with reference to FIG. 6, a modulating/demodulating circuit 62A according to a first application is described. The modulating/demodulating circuit 62A can be employed in place of the modulating/demodulating circuit 62 in the antenna substrate 6.

The modulating/demodulating circuit 62A includes a plurality of RC circuits 62a, 62b, and 62c and a switch circuit 64. The number of the plurality of RC circuits 62a, 62b, and 62c may be the same as the number of types of the control signal Sc1.

Each of the plurality of RC circuits 62a, 62b, and 62c, when electrically connected with the employed antenna of the printed antenna 61, forms an RLC circuit together with the employed antenna. It is noted that the employed antenna is a portion or all of the plurality of RC circuits 62a, 62b, and 62c.

The switch circuit 64, according to a received control signal Sc2, electrically connects one of the plurality of RC circuits 62a, 62b, and 62c to the first end 611a of the first unit coil 611 selectively. The control signal Sc2 is an example of a second control signal. In addition, the switch circuit 64 is an example of a second switch circuit.

The switch circuit 64 may be realized by a combination of multiple transistors.

In the present embodiment, the microprocessor 6z, mounted on the substrate 6x, outputs the control signal Sc1 to the switch circuit 63, and the control signal Sc2 to the switch circuit 64 via an I/O port 60. It is noted that in FIG. 6, the microprocessor 6z is not shown (refer to FIG. 3).

Contents of the control signal Sc2 are predetermined for each combination of the plurality of unit coils 611, 612, and 613 connected to the modulating/demodulating circuit 62A to become the employed antenna. Accordingly, the microprocessor 6z outputs the control signal Sc2 corresponding to the type of control signal Sc1 output to the switch circuit 63.

By employing the modulating/demodulating circuit 62A, it is possible to configure the RLC circuit with a higher degree of freedom in response to the specifications of the electronic tag 5a in the antenna substrate 6.

It is noted that the modulating/demodulating circuit 62A shown in FIG. 6 includes the three RC circuits 62a, 62b, and 62c that are the same in number as the types of the control signal Sc1 in the antenna substrate 6 shown in FIG. 3.

On the other hand, the modulating/demodulating circuit 62A may also only include two RC circuits 62a and 62b that are the same in number as the types of the control signal Sc1 in the antenna substrates 6A and 6B shown in FIG. 4 and FIG. 5. Such a modulating/demodulating circuit 62A may also be employed instead of the modulating/demodulating circuit 62 in the antenna substrates 6A and 6B.

[Second Application]

The microprocessor 6z of the antenna substrates 6, 6A, and 6B may also be omitted. In this case, the CPU of the control device 8, provided separately from the antenna substrates 6, 6A, and 6B, executes processes instead of the microprocessor 6z of the antenna substrates 6, 6A, and 6B.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An antenna substrate, comprising:
a substrate;
a modulating/demodulating circuit, mounted on the substrate, configured to output and input a communication signal used for short-range wireless communication with an electronic tag;
a printed antenna, printed on the substrate, configured to transmit and receive the communication signal as a radio wave; and
a first switch circuit mounted on the substrate, wherein
the printed antenna includes a plurality of unit coils, each of which is a metal foil printed in a coil-shape on the substrate,
an end of one of the plurality of unit coils is electrically connected to the modulating/demodulating circuit, and
the first switch circuit, according to a received first control signal, selectively switches between an electrically interrupted state and a state in which a portion or all of the plurality of unit coils is electrically connected in series.

2. The antenna substrate according to claim 1, wherein the plurality of unit coils are formed in parallel along a coil-shaped series of lines.

3. The antenna substrate according to claim 1, wherein the plurality of unit coils are formed concentrically aligned from an outer side going inwards along a coil-shaped series of lines.

4. The antenna substrate according to claim 1, wherein the substrate is a laminated substrate that includes a plurality of layers, and
each of the plurality of unit coils is concentrically formed in a region where the plurality of layers overlap each other.

5. The antenna substrate according to claim 1, wherein the modulating/demodulating circuit includes a plurality of RC circuits and a second switch circuit, wherein each of the plurality of RC circuits forms an RLC circuit together with a portion or all of the plurality of unit coils when electrically connected with the printed antenna, and the second switch circuit, according to a received second control signal, electrically connects one of the plurality of RC circuits to an end of one of the plurality of unit coils selectively.

6. The antenna substrate according to claim 1, further comprising
a processor, mounted on the substrate, configured to output the first control signal to the first switch circuit on the antenna substrate.

7. The antenna substrate according to claim 6, wherein
the processor is configured to execute a trial communication process of sequentially outputting multiple types of trial control signals that are respectively multiple types of first control signals, and attempting communication with the electronic tag via the modulating/demodulating circuit each time the processor outputs one of the multiple types of trial control signals, and
the processor, after a completion of the trial communication process, outputs a type of trial control signal that was output when the processor was able to properly communicate with the electronic tag in the trial communication process.

8. An image forming apparatus, comprising:
a unit attaching portion configured to have a replenishing unit storing developer removably attached thereto;
the antenna substrate according to claim 1, provided corresponding to the unit attaching portion; and
a processor configured to output the first control signal to the first switch circuit on the antenna substrate, and furthermore, read out information from an electronic tag that is attached on the replenishing unit attached to the unit attaching portion, by using the short-range wireless communication via the printed antenna on the antenna substrate.

9. The image forming apparatus according to claim 8, wherein
the processor is configured to execute a trial communication process of sequentially outputting multiple types of trial control signals that are respectively multiple types of first control signals, and attempting communication with the electronic tag via the modulating/demodulating circuit each time the processor outputs one of the multiple types of trial control signals, and
the processor, after a completion of the trial communication process, outputs a type of trial control signal that was output when the processor was able to properly communicate with the electronic tag in the trial communication process.

\* \* \* \* \*